United States Patent [19]

Paszek et al.

[11] Patent Number: 4,532,066
[45] Date of Patent: Jul. 30, 1985

[54] STABLE MILDLY ACIDIC AQUEOUS POLISHING CLEANSER AND PREPARATION THEREOF

[75] Inventors: Leon E. Paszek, Mountainside; Ernest Bernarducci, Rutherford, both of N.J.

[73] Assignee: Sterling Drug Inc., New York, N.Y.

[21] Appl. No.: 585,947

[22] Filed: Mar. 5, 1984

[51] Int. Cl.³ .............................................. C11D 7/08
[52] U.S. Cl. .................... 252/144; 252/100; 252/145; 252/174.21; 252/174.25
[58] Field of Search .............. 252/100, 136, 144, 145, 252/174.21, 174.25

[56] References Cited

U.S. PATENT DOCUMENTS

| | | | |
|---|---|---|---|
| 2,362,284 | 11/1944 | McDonald | 252/145 |
| 2,393,866 | 1/1946 | Wassell | 252/100 |
| 2,672,449 | 3/1954 | Snell | 252/100 |
| 3,214,380 | 10/1965 | Gangwisch | 252/100 |
| 3,661,787 | 5/1972 | Brown | 252/109 |
| 3,817,875 | 6/1974 | Bazan | 252/527 |
| 4,302,253 | 11/1981 | Ciullo | 106/208 |

*Primary Examiner*—Paul Lieberman
*Assistant Examiner*—Willie J. Thompson
*Attorney, Agent, or Firm*—Robert K. Bair; B. Woodrow Wyatt; Paul E. Dupont

[57] ABSTRACT

A stable mildly acidic aqueous polishing cleanser for removing stains from hard surfaces comprising by weight from about 8 to 20% of a polishing agent having an average particle size of about 2 to 10 microns and a particle size distribution from about 1 to 40 microns, from about 1 to 5% of a nonionic surfactant, from about 1 to 2.25% of a thickening agent comprising smectite clay and xanthan gum in a ratio of about 2:1 respectively, from about 1.25 to 6.25% of an oxalate salt selected from ammonium bioxalate or a mixture of ammonium bioxalate and ammonium oxalate, and from about 68 to 89% of water, said cleanser having a pH of about 3.0 to 4.5. Preparation of the cleanser and its properties are given.

6 Claims, No Drawings

STABLE MILDLY ACIDIC AQUEOUS POLISHING CLEANSER AND PREPARATION THEREOF

FIELD OF THE INVENTION

This invention relates to a stable mildly acidic aqueous polishing cleanser for removing stains from hard surfaces and to its preparation.

INFORMATION DISCLOSURE STATEMENT

McDonald U.S. Pat. No. 2,362,284, issued Nov. 7, 1944, discloses metal cleaning compositions particularly adapted for cleaning aluminum household utensils. This patent shows preferred compositions as paste or powder for cleansing of aluminum utensils to be "slightly on the acid side, but not having a pH lower than about 4.5 to 5.5", and containing about 20 parts of tripoli, about 20 parts of infusorial earth, about 20 parts of bentonite, about 15 parts of glucono delta-lactone or about 30 parts of gluconic acid in aqueous 50% solution, and about 2 parts of a wetting agent, e.g., aryl-alkyl sulfonate or sodium lauryl sulfonate. Oxalic acid and certain other organic carboxylic acids are stated in this patent to be unsatisfactory as cleaning agents for aluminum or other metal household utensils because they "form an insoluble or difficulty soluble metallic salt with the metal being cleansed which inhibits further cleansing action" and also because they "are very toxic and cannot be safely used for cleaning household aluminum utensils, since they frequently induce dermatitis."

Wassell U.S. Pat. No. 2,393,866, issued Jan. 29, 1946, discloses compositions for removing tarnish from metals containing as an essential ingredient "not substantially less than about 15 percent by weight of the composition . . . a polyoxyethylene diol having an average molecular weight of not less than about 400". The tarnish removing composition of Wassell "preferably also contains an abrasive and may contain other additional ingredients, which may conveniently be referred to as 'addends', to assist in removing the tarnish." Among the addends disclosed are oxalic acid and triethanolamine acid oxalate.

Snell U.S. Pat. No. 2,672,449 issued Mar. 16, 1954, discloses a thixotropic gel composition for cleaning metal, said composition consisting of the following essential ingredients: about 2.5% to about 8% by weight of bentonite; about 5.0% to about 70% by weight of an acid; about 0.1% to about 0.8% by weight of a surface active agent; and, sufficient water to make 100%. Oxalic acid is one of the acid ingredients disclosed.

Gangwisch U.S. Pat. No. 3,214,380, issued Oct. 26, 1965, discloses a liquid scouring cleaner which is said to be "a stable and effective liquid scouring cleanser for removing stains from hard surfaces (which) comprises about 0.2 to 5% of oxalic acid, 30 to 75% of very finely divided silex (silicon dioxide), 1 to 7% of an ionic organic detergent having a group which is a higher alkyl radical of 12 to 18 carbon atoms or a polymeric lower alkylene oxide chain containing 12 to 18 carbon atoms, 0.5 to 10% of a nonionic thickening agent having surface active and emulsifying properties and 15 to 60% water".

It is further stated that the pH of this cleanser "should be from 1 to 3.8" and that it is preferred "to have water soluble oxalate (sodium salt shown) present and if present, the ratio of oxalic acid to oxalate should be within the range of 1:1 to 100:1".

The particle size of the silicon dioxide is described as follows:

"Essentially, such silex is of particle diameter 99.9% less than 250 microns, 99.0% less than 150 microns and 83 to 93% less than 75 microns. For gentler cleaning, about 99% of the particles, by weight, may be smaller than 75 microns, with none greater than 150 microns in diameter."

Brown U.S. Pat. No. 3,661,787, issued May 9, 1972, discloses saturated aliphatic dicarboxylic acid salts as detergent builders, among which are diammonium and disodium oxalate.

Bazan U.S. Pat. No. 3,817,875, issued June 18, 1974, discloses a heavy-duty multipurpose cleaner comprising various prescribed ingredients comprising: (A.) about 75% of a mixture of approximately 1.5 parts ammonium oxalate, three other ingredients and inert materials; (B.) about 20% of a mixture of two other ingredients and inert materials; and (C.) about 5% total water.

Ciullo U.S. Pat. No. 4,302,253 issued Nov. 24, 1981, discloses a synergistic thickening agent for acid cleaning compositions comprising (a) swellable smectite clay, (b) xanthan gum and (c) a 2-($C_{7-17}$-alkyl)-1-(2-hydroxyethyl)imidazoline where the ratio of smectite to xanthan gum is about 9:1 to about 1:1 and the ratio of the smectite to the imidazoline is about 9:1 to 1:2. Also disclosed is a liquid cleaning composition comprising: (a) up to about 30% by weight of mineral acid; (b) said thickening agent; and, (c) water.

SUMMARY OF THE INVENTION

In a composition aspect, the invention resides in a stable mildly acidic aqueous polishing cleanser for removing stains from hard surfaces comprising prescribed quantities by weight of five essential ingredients, namely, from about 8 to 20% of a finely divided polishing agent, from about 1 to 5% of a nonionic surfactant, from about 1 to 2.25% of a thickening agent, about 1.25 to 6.25% of an oxalate salt, and, from about 68 to 89% of water, said cleanser having a pH of about 3.0 to 4.5.

In a process aspect, the invention resides in the process for preparing a stable mildly acidic aqueous polishing cleanser for removing stains from hard surfaces comprising by weight from about 8 to 20% of a polishing agent having an average particle size of about 2 to 4 microns, from about 1 to 5% of a nonionic surfactant, from about 1 to 2.25% of a thickening agent, about 1.25 to 6.25% of an oxalate salt, and, from about 68 to 89% of water, which process comprises adding successively with stirring or mixing to the water heated to about 110°–150° F. the polishing agent, the thickening agent and the nonionic surfactant, cooling the mixture to at least below 80° F., then adding successively with stirring or mixing about 1 to 5% by weight of oxalic acid dihydrate and about 1.2 to 1.6 mole equivalent of ammonium hydroxide per mole of oxalic acid, and, if necessary, adjusting the pH to about 3.0 to 4.5.

In another process aspect, the invention resides in the process for preparing a stable mildly acidic aqueous polishing cleanser for removing stains from hard surfaces comprising by weight from about 8 to 20% of a polishing agent having an average particle size of about 2 to 10 microns, from about 1 to 5% of a nonionic surfactant, from about 1 to 2.25% of a thickening agent, about 1.25 to 6.25% of an oxalate salt, and, from about 68 to 89% of water, which process comprises adding successively with stirring or mixing to the water the thickening agent, the nonionic surfactant, about 1 to 5% by weight of oxalic acid dihydrate, about 1.2 to 1.6 mole equivalent of ammonium hydroxide per mole of oxalic acid, if necessary adjusting the pH to about 3.0 to 4.5, and, the polishing agent.

DETAILED DESCRIPTION INCLUSIVE OF PREFERRED EMBODIMENTS

In a composition aspect, the invention resides in a stable mildly acidic aqueous polishing cleanser for removing stains from hard surfaces comprising by weight from about 8 to 20% of a polishing agent having an average particle size of about 2 to 10 microns and a particle size distribution from about 1 to 40 microns, from about 1 to 5% of a nonionic surfactant, from about 1 to 2.25% of a thickening agent comprising smectite clay and xanthan gum in a ratio of about 2:1 respectively, from about 1.25 to 6.25% of an oxalate salt selected from ammonium bioxalate or a mixture of ammonium bioxalate and ammonium oxalate, and from about about 68 to 89% of water, said cleanser having a pH of about 3.0 to 4.5. The viscosity of the cleanser composition aspect of the invention ranges from about 5,700 to 14,000 centipoises. Preferred embodiments of this composition aspect of the invention are those comprising by weight about 14 to 16% of a polishing agent having an average particle size of about 2 microns and a particle size distribution of about 1 to 15 microns, about 2 to 3% of a nonionic surfactant, about 1.0 to 1.1% of smectite clay, about 0.5 to 0.60% of xanthan gum and about 3.75 to 5% of ammonium bioxalate or a mixture of ammonium bioxalate and ammonium oxalate, and having a pH of about 3.5 to 4.0.

In a preferred process aspect, the invention resides in the process for preparing a stable mildly acidic aqueous polishing cleanser for removing stains from hard surfaces comprising by weight from about 8 to 20% of a polishing agent having an average particle size of about 2 to 4 microns, from about 1 to 5% of a nonionic surfactant, from about 1 to 2.25% of a thickening agent consisting of smectite clay and xanthan gum in a weight ratio of about 2:1 respectively, from about 1.25 to 6.25% of an oxalate salt selected from ammonium bioxalate or a mixture of ammonium bioxalate and ammonium oxalate, and from about 68 to 89% of water, said process which comprises adding successively with stirring or mixing to the water heated to about 110°–150° F. the polishing agent, the smectite clay, the xanthan gum and the nonionic surfactant, cooling the mixture to at least below 80° F., then adding successively with stirring or mixing about 1 to 5% by weight of oxalic acid as its dihydrate and about 1.2 to 1.6 mole equivalent of ammonium hydroxide per mole of oxalic acid, and, if necessary, adjusting the pH to about 3.0 to 4.5. Preferred embodiments of this process aspect of the invention utilize about 14 to 16% of the polishing agent having an average particle size of about 2 microns and a particle size distribution of about 1 to 15 microns, about 2 to 3% of a nonionic surfactant, about 1.0 to 1.1% of smectite clay, about 0.5 to 0.60% of xanthan gum, about 3 to 4% of oxalic acid and 2.34% to 3.12% of concentrated aqueous ammonium hydroxide solution, and having a pH of about 3.5 to 4.0.

In another process aspect, the invention resides in the process for preparing a stable mildly acidic aqueous polishing cleanser for removing stains from hard surfaces comprising by weight from about 8 to 20% of a polishing agent having an average particle size of about 2 to 10 microns and having a particle size distribution from about 1 to 40 microns, from about 1 to 5% of a nonionic surfactant, from about 1 to 2.25% of a selected thickening agent, about 1.25 to 6.25% of an ammonium oxalate salt, and, from about 68 to 89% of water, which process comprises adding successively with stirring or mixing to the water, smectite clay, xanthan gum, the nonionic surfactant, about 1 to 5% by weight of oxalic acid as its dihydrate, about 1.2 to 1.6 mole equivalent of ammonium hydroxide per mole of oxalic acid, if necessary adjusting the pH to about 3.0 to 4.5, and, the polishing agent. Preferred embodiments of this process aspect utilizes about 14 to 16% of a polishing agent having an average particle size about 2 microns and a particle size distribution of about 1 to 15 microns, about 1.0 to 1.1 g of smectite clay and about 0.50 to 0.60% of xanthan gum, about 2 to 3% of nonionic surfactant, about 3 to 4% of oxalic acid and about 2.34% to 3.12% of concentrated aqueous ammonium hydroxide solution, and having a pH of about 3.5 to 4.0.

The adjustment of the pH where necessary was done by adding oxalic acid dihydrate if the pH was greater than 4.0 or by adding ammonium hydroxide if the pH was less than 3.5.

The concentrated aqueous ammonium hydroxide used herein contains approximately 27 to 30% w/w of ammonia.

Ammonium bioxalate as used herein also is known as ammonium acid oxalate, ammonium hydrogen oxalate or ammonium binoxalate. Ammonium oxalate as used herein also is known as ethanedioic acid diammonium salt or diammonium oxalate.

The preferred polishing agent used herein is silica or silicon dioxide having an average particle size of about 2 to 4 microns and having a particle size distribution of about 1 to 15 microns, e.g., "20 Silica" (Whitaker, Clark and Daniels, Inc.) of particle size 99% less than 15 microns, 94% less than 10 microns, 70% less than 5 microns, 64% less than 4 microns, 38% less than 2 microns and 18% less than 1 micron, and having an average particle size of 2 microns. This preferred polishing agent in the cleanser of the invention imparts polishing but no scratching action to even delicate hard surfaces. Also acceptable for use herein is a polishing agent of slightly larger particle size such as silicon dioxide having a particle size up to about 10 microns and having a particle size distribution of about 1 to 40 microns, e.g., "19 Silica" (Whittaker, Clark and Daniels, Inc.) of particle size 99% less than 40 microns, 98% less than 20 microns, 77% less than 15 microns, 62% less than 10 microns, 40% less than 5 microns, 36% less than 4 microns, 22% less than 2 microns and 14% less than 1 micron. This silica of slightly larger particle size cannot be used in said preferred process aspect of the invention wherein the silica is added before the thickening or suspending agent since it settles to the bottom of the container and precludes adequate mixing of other ingredients. A necessary requisite for the polishing agent herein is that it must contain less than 1%, preferably no more than about 0.1% of $Al_2O_3$, which would react with the oxalic acid used in the process aspects of the invention.

Any one of a variety of nonionic surfactants can be used herein. Found particularly suitable are polyoxyethylene derivatives of higher alcohols, such as NEODOL ® 23-6.5 which is based on Shell Chemical Company's primary $C_{12}$-$C_{13}$ Detergent Alcohol (NEODOL ® 23) and has an average of 6.5 ethylene oxide (EO) units per alcohol mole (about 59% w EO). Other illustrative suitable nonionic surface active agents are Union Carbide's polyethylene glycol ether of linear alcohol (9 moles EO), [TERGITOL ® 15-S-9], Rohm and Haas' octylphenoxypolyethoxyethanol (9-10 EO) [TRITON ® X-100], and, BASF Wyandotte's 40% polyoxyethylene 60% polyoxypropylene ]PLURONIC ® L-64].

The smectite clay is a hydrated magnesium aluminum silicate [VEEGUM ®, R. T. Vanderbilt Co.], which swells many times its original volume when added to water, and is known as a suspending or thickening agent. As used herein, along with the xanthan gum, it acts as a thickening or suspending agent for the polishing agent, e.g., silica. The xanthan gum used herein was KELZAN ® S [Kelco, Division of Merck and Co.].

The said proportions of essential ingredients were found necessary to produce a stain-removing polishing cleanser of required stability and effectiveness. For example, quantities of surfactant smaller than the prescribed percentages yielded a product having inadequate cleansing and stain-removing properties and larger quantities than that prescribed adversely affected the stability of the cleanser. The particle size and prescribed quantities of polishing agent were necessary to polish without scratching formica, enamel, chrome or other scratchable surfaces being cleaned, as well as to remove rust, lime, fruit and tea stains from various hard surfaces. Quantities of said suspending agents larger than that prescribed unduly thickened the cleanser to detract from its usefulness and quantities less than that prescribed resulted in a less stable product from which the polishing agent separated.

The prescribed amounts of ammonium hydroxide and oxalic acid used in process aspects of the invention provide a stable aqueous cleanser formulation containing no free oxalic acid but only ammonium bioxalate or a mixture of ammonium bioxalate and ammonium oxalate with the attendant prescribed pH range, above and below which an unstable formulation resulted.

In addition to the above-described essential ingredients of the present polishing cleanser, there may be added other adjuvants which contribute desirable properties to the cleanser and which do not detract from the cleansing or polishing properties of the cleanser or lessen its stability. For example, fragrances, dyes, fluorescent materials, propellants (for preparing pressurized compositions), and other compatible additional materials for furthering or enhancing the action of any of the said essential ingredients may be added, provided they would not detract from the desired properties of the cleanser in the relatively minor amounts in which they would be used.

The following examples will further illustrate cleansers made according to the aspects of this invention. They are illustrative and are not to be considered as limiting the scope of the claims.

Example 1

| Ingredients | Parts by Weight |
| --- | --- |
| Water | 75.13 |
| Silica[a] | 15.00 |
| Oxalic acid dihydrate | 3.50 |
| 29% Ammonium Hydroxide | 2.73 |
| Nonionic surfactant[b] | 2.00 |
| Smectite clay | 1.00 |
| Xanthan gum | 0.50 |
| Preservative | 0.03 |
| Fragrance | 0.10 |
| Dye | 0.01 |
| | 100.00 |

[a]Average particle size of 2 microns ["20 SILICA"]
[b]$C_{12}$-$C_{13}$ Alcohol (6.5 EO) Ethoxylate [NEODOL ® 23-6.5]

A stable mildly acidic aqueous polishing cleanser for removing stains from hard surfaces was made on a small or laboratory scale in a beaker with an efficient stirrer or on a large or manufacturing scale using a turbine mixer with sidescraper mixing vessel (20 gallon stainless steel no. 304 pot) as follows: The water containing the preservative (5-chloro-2-methyl-4-isothiazolin-3-one) was heated to approximately 140° F., the silica was added with stirring or mixing and the mixture was stirred or mixed until a fine dispersion was obtained (about 5 to 10 minutes). The smectite clay was slowly added to the mixture with stirring or mixing and the resulting mixture was stirred or mixed for about 15 to 30 minutes. Next the xanthan gum was added slowly with stirring or mixing and the stirring or mixing was continued for about 30 minutes. The nonionic surfactant was added with stirring or mixing, the stirring or mixing was continued for about 15 minutes and the temperature was lowered to about 72° F. The oxalic acid was added with stirring or mixing, which was continued for about 10 minutes. The ammonium hydroxide was added, preferably below the surface of the mixture to avoid evolution of ammonia fumes, and stirring or mixing was continued for about fifteen minutes. The dye was added in aqueous solution and stirring or mixing was continued for about 10 minutes or until color of the mixture is uniform. Fragrance was added and stirring or mixing was continued for about 20 to 25 minutes. If necessary, the pH was adjusted to about 3.5 to 4.0 by addition of either ammonium hydroxide or oxalic acid. The viscosity of cleansers prepared by this procedure ranges between about 6,000 and 8,000 centipoises.

EXAMPLE 2

The formulation according to Example 1 but using an equivalent quantity of silica having an average particle size of 8.5 microns ["19 SILICA"] in place of the silica having an average particle size of 2 microns was prepared using a Ross Homogenizer as follows. The water containing the preservative was added to the container, preferably keeping the baffle plate approximately two inches below the surface of the aqueous solution. Smectite clay was sprinkled into the solution, avoiding clumping, sometimes by manually stirring to disperse floating clumps of smectite clay. Xanthan gum was sprinkled into the mixture, also avoiding clumping as above. After the mixture was homogeneous (no clumps), it was mixed for about 15 minutes. The nonionic surfactant was added and mixing was continued for about 10 minutes. Oxalic acid dihydrate was added and mixing was continued for about 10 minutes. Ammonium hydroxide was added, preferably below the surface of the mixture, and mixing continued for about 10 minutes. A portion of the mixture was extracted and tested for pH. If necessary, the pH was adjusted to 3.5 to 4.0, either by adding oxalic acid dihydrate if the pH was greater than 4.0 or by adding ammonium hydroxide if the pH was less than 3.5. Next the dye was added, preferably in water and then the fragrance or perfume was added. Silica then was added slowly and, after the addition had been completed, the formulation was mixed for about 15 minutes.

The procedure of Example 2 also can be used by substituting an equivalent quantity of silica having an average particle size of 2 microns for the silica having an average particle size of 8.5 microns. The procedure of Example 1 cannot be used with the silica having the larger average particle size of 8.5 microns.

EXAMPLE 3

Following the procedure described in Example 1 but using in place of 2% by weight of $C_{12}$–$C_{13}$ Alcohol (6.5 EO) Ethoxylate [NEODOL ® 23-6.5] 5% by weight of this nonionic surfactant, 2 or 5% by weight of octylphenoxypolyethoxyethanol (9-10 EO) [TRITON® X-100, Rohm and Hass Co.], or, 2 or 5% of polyethylene glycol of linear alcohol (9 moles EO) [TERGITOL® 15-S-9, ave. mol. wt. 596, Union Carbide Corp.], satisfactory polishing cleanser formulations were obtained.

EXAMPLE 4

Following the procedure described in Example 1 but using in place of 1% by weight of smectite clay and 0.5% by weight of xanthan gum, 0.70% of smectite clay and 0.35% of xanthan gum or 1.50% of smectite clay and 0.75% of xanthan gum, satisfactory polishing cleansers having respective viscosities of 5,700 and 14,000 centipoises were obtained.

Comparison of Polishing Cleanser with Related Known Cleansers

The polishing cleanser of Example 1 was found to have superior polishing and stain-removing properties when compared with related known cleansers, namely, a highly acidic cleanser prepared by the Gangwisch procedure (U.S. Pat. No. 3,214,380) and the highly alkaline commercial NOXON ® 7 Liquid Metal Polish [Boyle-Midway Inc.].

A modified Gangwisch cleanser was prepared following the procedure of Example 1 of U.S. Pat. No. 3,214,380 but using the following parts by weight of (the Gangwisch ingredients and quantities thereof being given in parentheses): 1.63 oxalic acid, 0.34 sodium oxalate, 57.63 silica having an average particle size of 8.5 microns and having a particle size distribution given above for "20 Silica" (Whittaker, Clark and Daniels, Inc.) and further of particle size 99.99% through 200 mesh sieve, 99%+ through 325 mesh sieve and 95% through 400 mesh sieve (compared with silica of larger particle size used by Gangwisch, namely, 99.9%+ through 60 mesh sieve, 99.0%+ through 100 mesh sieve and 90%+ through 200 mesh sieve), 8.34 sodium dodecyl benzenesulfonate slurry consisting of 40% said sulfonate, 0.44 sodium sulfate and 60% water (compared with 7.11 sodium tridecyl benzenesulfonate slurry consisting of 47% said sulfonate, 7% sodium sulfate and 40% water), 1.63 g ethoxylate coconut fatty acids monoethanolamide [AMEDOX ® $C_2$, Stepan] (compared with diethoxy coconut oil fatty acids monoethanolamide used by Gangwisch), 29.7 water (compared with 31.44 water used by Gangwisch). Shearing agitation was accomplished with both propellar mixer and Ross Homogenizer. The pH of the cleanser thus obtained was 1.8.

Said NOXON metal polish had a pH of 10 and was found to contain the following ingredients by weight: 66.53 water, 2.63 isopropyl alcohol, 0.76 ethanol, 1.59 ammonia (100%), 20.63 silica, 1.8 oxalic acid, 3.48 fatty acids (soap) and 1.56 unidentified.

Comparative studies of the mildly acidic aqueous polishing cleanser of instant Example 1 with the modified Gangwisch and NOXON cleansers were performed on instruments similar to the Gardner Washability and Abrasion Instruments. Analysis for abrasion levels were performed with the aid of a Gardner 60° Glossmeter and reported as percent gloss loss (% GL)=$X_o - X_c/X_o$, where $X_o$ is the glossmeter reading of untreated surface and $X_c$ is the glossmeter reading of treated surface. Analyses for stain and soil removal were carried out by procedures taken from the Shell General Customer Report, Hard Surface Cleaners and Liss, R. L., Hiltin, T. B., *Soap Chem. Spec.* 36, 51-4 (1960). These results are reported as percent soil or stain removal (% SR), where % SR=$Y_s - Y_{H2O}/Y_o - Y_{H2O}$, where $Y_{H2O}$ is the reflectance reading with a 45° Gardner Glossmeter of soiled panel after scrubbing with a damp sponge, $Y_s$ is the reflectance reading after scrubbing a soiled panel with the test solution and Yo is the reflectance of the original panel before soiling.

Preparation of Stain and Soil Panels—For stained panels, unglazed porous ceramic plates were allowed to soak in concentrated tea or grape juice solutions for 48 hours. For soiled panels, soil solutions similar to those listed in above-mentioned Shell report were placed on Sanitas wall clad paper and allowed to dry and set. Rust stained porcelain strips were prepared as in Federal Specification P-C-450B, Nov. 8, 1960.

Stability Testing—The polishing cleanser of instant Example 1 was found to have a stable pH reading and to be non-separating for 35 days at temperatures ranging from ambient to 120° F. The modified Gangwisch formula was reported as being stable for 40 days at these temperatures. Formulations prepared in our laboratories according to the modified Gangwisch formula separated after 17 days.

Abrasion Test Results—The polishing cleanser of instant Example 1 was found to be much less abrasive than either the modified Gangwisch cleanser or the NOXON cleanser; in fact, on some surfaces it was found to result in a gloss increase. Comparative test results follow:

| Cleanser | % GL |
|---|---|
| Surface A: Enameled Aluminum | |
| Example 1 | +8.3 (gloss increase) |
| Ganwisch | 73.4 (gloss loss) |
| Noxon | 7.0 (gloss loss) |
| Surface B: Formica | |
| Example 1 | 6.2 (gloss increase) |
| Ganwisch | 2.5 (gloss loss) |
| Noxon | 6.2 (gloss increase) |
| Surface C: Aluminum | |
| Example 1 | 0 (no change) |
| Gangwisch | 0 (no change) |
| Noxon | 0 (no change) |
| Surface D: Stainless Steel | |

| Cleanser | % GL |
|---|---|
| Example 1 | 0 |
| Gangwisch | 0* |
| Noxon | 0* |

*scratching visually evident

Stain Removal Results—The polishing cleanser of instant Example 1 was found to be clearly more effective than either the modified Gangwisch cleanser or the Noxon cleanser in removing tea stain and to be comparable with the Gangwisch cleanser in removing grape stain as seen from the following test results:

| | Tea Stain Removal (% SR = percent stain removal) | | |
|---|---|---|---|
| Cleanser | Test One % SR | Test Two % SR | Test Three % SR |
| Example 1 | 68.7 | 58.8 | 42.5 |
| Gangwisch | 41.3 | 41.9 | 17.8 |
| Noxon | 2.5 | 1.4 | 5.3 |

| | Grape Stain Removal (% SR = percent stain removal) | |
|---|---|---|
| Cleanser | Test One % SR | Test Two % SR |
| Example 1 | 47.8 | 40.0 |
| Gangwisch | 50.5 | 43.5 |
| Noxon | 12.3 | 20.0 |

Washability and Rust Removal Aspects—Because of the lower concentration of surfactant used in the instant polishing cleanser, it is not as effective in soil removal as the Gangwisch or Noxon cleansers. Also, since the instant cleanser was developed with a mild pH to be safer and more gentle to use, it is not as effective in rust removal as the more acidic Gangwisch cleanser; however, it was found to be clearly more effective than the highly alkaline NOXON cleanser in removing rust stains.

Tarnish Removal Properties—The polishing cleanser of Example 1 also was found to be an excellent tarnish remover for silverware and brassware.

We claim:

1. A stable mildly acidic aqueous polishing cleanser for removing stains from hard surfaces comprising by weight from about 8 to 20% of a polishing agent having an average particle size of about 2 to 10 microns and a particle size distribution from about 1 to 40 microns, from about 1 to 5% of a nonionic surfactant, from about 1 to 2.25% of a thickening agent comprising smectite clay and xanthan gum in a ratio of about 2:1 respectively, from about 1.25 to 6.25% of an oxalate salt selected from ammonium bioxalate or a mixture of ammonium bioxalate and ammonium oxalate, and from about 68 to 89% of water, said cleanser having a pH of about 3.0 to 4.5.

2. A polishing cleanser according to claim 1 comprising by weight about 14 to 16% of a polishing agent having an average particle size of about 2 microns and a particle size distribution of about 1 to 15 microns, about 2 to 3% of a nonionic surfactant, about 1.0 to 1.1% of smectite clay, about 0.5 to 0.60 of xanthan gum and about 3.75 to 5% of an oxalate salt, and having a pH of about 3.5 to 4.0.

3. The process for preparing a stable mildly acidic aqueous polishing cleanser for removing stains from hard surfaces comprising by weight from about 8 to 20% of a polishing agent having an average particle size of about 2 to 4 microns, from about 1 to 5% of a nonionic surfactant, from about 1 to 2.25% of a thickening agent consisting of smectite clay and xanthan gum in a weight ratio of about 2:1 respectively, from about 1.25 to 6.25% of an oxalate salt selected from ammonium bioxalate or a mixture of ammonium bioxalate and ammonium oxalate, and from about 68 to 89% of water, said process which comprises adding successively with stirring or mixing to the water heated to about 110°–150° F. the polishing agent, the smectite clay, the xanthan gum and the nonionic surfactant, cooling the mixture to at least below 80° F., then adding successively with stirring or mixing about 1 to 5% by weight of oxalic acid as its dihydrate and about 1.2 to 1.6 mole equivalent of ammonium hydroxide per mole of oxalic acid, and, if necessary, adjusting the pH to about 3.0 to 4.5.

4. The process according to claim 3 utilizing about 14 to 16% of a polishing agent having an average particle size about 2 microns and a particle size distribution of about 1 to 15 microns, about 2 to 3% of a nonionic surfactant, about 1.0 to 1.1% of smectite clay, about 0.5 to 0.60% of xanthan gum, about 3 to 4% of oxalic acid and about 2.34% to 3.12% of concentrated aqueous ammonium hydroxide solution, and having a pH of about 3.5 to 4.0.

5. The process for preparing a stable mildly acidic aqueous polishing cleanser for removing stains from hard surfaces comprising by weight from about 8 to 20% of a polishing agent having an average particle size of about 2 to 10 microns and having a particle size distribution from about 1 to 40 microns, from about 1 to 5% of a nonionic surfactant, from about 1 to 2.25% of a selected thickening agent, about 1.25 to 6.25% of an oxalate salt selected from ammonium bioxalate or a mixture of ammonium bioxalate and ammonium oxalate, and, from about 68 to 89% of water, said process which comprises adding successively with stirring or mixing to the water, smectite clay, xanthan gum, the nonionic surfactant, about 1 to 5% by weight of oxalic acid as its dihydrate about 1.2 to 1.6 mole equivalent of ammonium hydroxide per mole of oxalic acid, if necessary adjusting the pH to about 3.0 to 4.5, and, the polishing agent.

6. The process according to claim 5 utilizing about 14 to 16% of a polishing agent having an average particle size about 2 microns and a particle size distribution of about 1 to 15 microns, about 1.0 to 1.1 g of smectite clay, about 0.50 to 0.60% of xanthan gum, about 2 to 3% of nonionic surfactant, about 3 to 4% of oxalic acid and about 2.34% to 3.12% of concentrated aqueous ammonium hydroxide solution, and having a pH of about 3.5 to 4.0.

* * * * *